US012776835B2

(12) United States Patent
Abe

(10) Patent No.: US 12,776,835 B2
(45) Date of Patent: Oct. 27, 2026

(54) OPTICAL SIGNAL MONITORING APPARATUS, OPTICAL SIGNAL MONITORING SYSTEM, AND OPTICAL SIGNAL MONITORING METHOD

(71) Applicant: NEC Corporation, Tokyo (JP)

(72) Inventor: Ryota Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 549 days.

(21) Appl. No.: 18/237,227

(22) Filed: Aug. 23, 2023

(65) Prior Publication Data

US 2024/0072890 A1 Feb. 29, 2024

(30) Foreign Application Priority Data

Aug. 30, 2022 (JP) ................................ 2022-137011

(51) Int. Cl.
*H04B 10/07* (2013.01)
*H04B 10/071* (2013.01)
(Continued)

(52) U.S. Cl.
CPC ........... *H04B 10/071* (2013.01); *H04B 10/25* (2013.01); *H04B 10/07* (2013.01); *H04B 10/29* (2013.01); *H04J 14/00* (2013.01)

(58) Field of Classification Search
CPC ...... H04B 10/071; H04B 10/25; H04B 10/07; H04B 10/29; H04J 14/00
(Continued)

(56) References Cited

U.S. PATENT DOCUMENTS 6,038,046 A * 3/2000 Kaneko ............... H04J 14/0201 398/1
6,038,063 A * 3/2000 Tsuda .................... H01S 3/1301 398/1
(Continued)

FOREIGN PATENT DOCUMENTS

JP H10-256995 A 9/1998
JP 2002-280968 A 9/2002
(Continued)

OTHER PUBLICATIONS

Japanese Office Action for JP Application No. 2022-137011, mailed on Jun. 16, 2026 with English Translation.

*Primary Examiner* — Dibson J Sanchez
(74) *Attorney, Agent, or Firm* — Sughrue Mion, PLLC

(57) ABSTRACT

An optical signal monitoring apparatus is used in an optical submarine cable system in which a first branch line is connected to a transmission line being connected to a predetermined terminal station provided in a trunk line, and a second branch line is connected to a reception line being connected to the terminal station. In the optical signal monitoring apparatus, a first extraction unit selectively extracts first monitoring light included in a transmission signal transmitted from the transmission line to the first branch line. A first relay line transmits the extracted first monitoring light to the second branch line. A first merging unit merges the first monitoring light from the first relay line into a reception signal of the second branch line. Further, the first extraction unit transmits, to the first relay line, return light transmitted in a direction opposite to the transmission signal in the first branch line.

20 Claims, 7 Drawing Sheets

(51) Int. Cl.
*H04B 10/25* (2013.01)
*H04B 10/29* (2013.01)
*H04J 14/00* (2006.01)

(58) Field of Classification Search
USPC .......................... 398/9–38, 43–103, 173–181
See application file for complete search history.

(56) References Cited

U.S. PATENT DOCUMENTS

| | | | | | |
|---|---|---|---|---|---|
| 6,327,060 | B1 * | 12/2001 | Otani | H04B 10/0775 | 398/83 |
| 9,813,182 | B2 * | 11/2017 | Ji | H04J 14/0205 | |
| 2002/0063921 | A1 * | 5/2002 | Terahara | H04J 14/0245 | 398/167 |
| 2009/0324231 | A1 * | 12/2009 | Nakano | H04J 14/0246 | 398/79 |
| 2011/0076017 | A1 * | 3/2011 | Midorikawa | H04J 14/0201 | 398/48 |
| 2012/0177362 | A1 * | 7/2012 | Zhang | H04J 14/0202 | 398/9 |
| 2014/0104599 | A1 * | 4/2014 | Lee | G01M 11/3145 | 356/73.1 |
| 2014/0212131 | A1 * | 7/2014 | Zhang | H04B 10/071 | 398/16 |
| 2014/0255020 | A1 * | 9/2014 | Zhang | H04J 14/0294 | 398/3 |
| 2016/0149663 | A1 * | 5/2016 | Ji | H04J 14/0212 | 398/48 |
| 2018/0054271 | A1 * | 2/2018 | Abe | G02B 6/29367 | |
| 2020/0259584 | A1 * | 8/2020 | Ugajin | H04B 10/85 | |
| 2021/0067264 | A1 * | 3/2021 | Abe | H04J 14/0213 | |
| 2022/0321235 | A1 * | 10/2022 | Salsi | G02B 6/293 | |
| 2024/0063899 | A1 | 2/2024 | Masuda | | |

FOREIGN PATENT DOCUMENTS

| | | | |
|---|---|---|---|
| WO | 2020/194842 | A1 | 10/2020 |
| WO | 2022/154038 | A1 | 7/2022 |

* cited by examiner

OPTICAL SIGNAL MONITORING APPARATUS, OPTICAL SIGNAL MONITORING SYSTEM, AND OPTICAL SIGNAL MONITORING METHOD

INCORPORATION BY REFERENCE

This application is based upon and claims the benefit of priority from Japanese patent application No. 2022-137011, filed on Aug. 30, 2022, the disclosure of which is incorporated herein in its entirety by reference.

TECHNICAL FIELD

The present disclosure relates to an optical signal monitoring apparatus, an optical signal monitoring system, and an optical signal monitoring method.

BACKGROUND ART

An optical submarine cable system has wavelength multiplexing equipment (WME), submarine line terminating equipment (SLTE), a transponder (TPND), a system monitoring apparatus, and the like on a terminal station side, and has a transmission, relay, and branching apparatus on a submarine cable. In addition, various management techniques using an optical time domain reflectometer (OTDR) have been proposed for detecting transmission loss and disconnection, measuring distances, or the like of an optical fiber cable.

In a technique described in Patent Literature 1 (Japanese Unexamined Patent Application Publication No. 2002-280968), a monitoring signal light return circuit including an optical amplifier, a variable optical attenuator, and a wavelength selective reflection means is provided between upstream and downstream optical fiber transmission lines opposing each other, and an intensity level of monitoring signal light sent back to an opposing optical transmission line is adjusted by the variable optical attenuator.

In a technique described in Patent Literature 2 (International Patent Publication No. WO2020/194842), an optical cable system in which terminal stations are connected by a plurality of optical fiber transmission lines includes a control unit and a switching unit. The switching unit is connected to a plurality of first optical fiber transmission lines connected to a first terminal station, a plurality of second optical fiber transmission lines connected to a second terminal station, and a third optical fiber transmission line connected to a third terminal station, and switches a transmission path of a wavelength multiplexed optical signal. The control unit controls switching of the transmission paths by the switching unit.

Meanwhile, in an optical submarine cable system, a redundancy technique of interconnecting branches branching from a plurality of trunks has been proposed. In addition, in a system in which branches are interconnected, there is a demand for a technique of being able to monitor a failure of a repeater and detect a cable breakage point.

SUMMARY

In view of the above-described problem, an example object of the present disclosure is to provide an optical signal monitoring apparatus capable of monitoring quality of a branch line in an optical submarine cable system in which branches are interconnected.

In a first example aspect, an optical signal monitoring apparatus according to the present disclosure is used in an optical submarine cable system in which a first branch line is connected to a transmission line being connected to a predetermined terminal station provided in a trunk line and a second branch line is connected to a reception line being connected to the terminal station. The optical signal monitoring apparatus includes a first extraction unit, a first relay line, and a first merging unit. The first extraction unit selectively extracts first monitoring light included in a transmission signal transmitted from the transmission line to the first branch line. The first relay line transmits the extracted first monitoring light to the second branch line. The first merging unit merges the first monitoring light from the first relay line into a reception signal of the second branch line. Further, the first extraction unit transmits, to the first relay line, return light being transmitted in a direction opposite to the transmission signal in the first branch line.

In a second example aspect, an optical signal monitoring method according to the present disclosure causes an optical signal monitoring apparatus to perform the following optical signal monitoring method, in an optical submarine cable system in which a first branch line is connected to a transmission line being connected to a predetermined terminal station provided in a trunk line, and a second branch line is connected to a reception line being connected to the terminal station. The optical signal monitoring apparatus selectively extracts first monitoring light included in a transmission signal transmitted from the transmission line to the first branch line. The optical signal monitoring apparatus transmits the extracted first monitoring light to the second branch line via a first relay line connecting between the first branch line and the second branch line. The optical signal monitoring apparatus merges the first monitoring light from the first relay line into a reception signal of the second branch line. In a case where the first branch line is broken, the optical signal monitoring apparatus transmits return light being generated from the broken part and transmitted in a direction opposite to the transmission signal, from the first branch line to the first relay line.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figure 1:
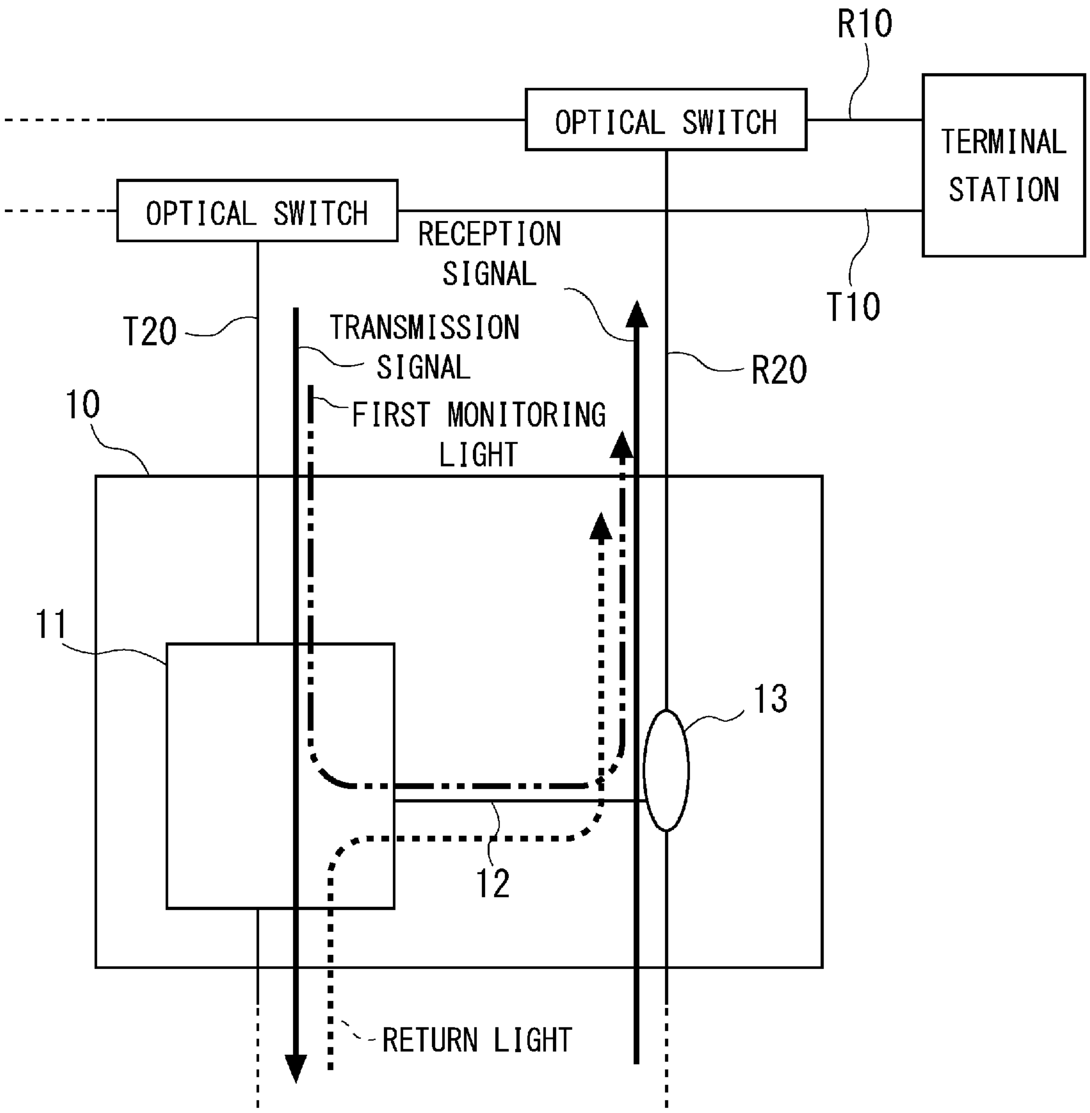
FIG. 1 is a configuration diagram of an optical signal monitoring apparatus according to a first example embodiment.

Hereinafter, the present disclosure will be described with reference to the example embodiments, but the disclosure according to the claims is not limited to the following example embodiments. Further, not all of the configurations described in the example embodiments are essential as means for solving the problem. For clarity of explanation, the following description and the drawings are omitted and simplified as appropriate. Note that, in the drawings, the same elements are denoted by the same reference numerals, and redundant descriptions are omitted as necessary.

First Example Embodiment

Hereinafter, the present example embodiment will be described with reference to the drawings. FIG. 1 is a configuration diagram of an optical signal monitoring apparatus 10 according to a first example embodiment. The optical signal monitoring apparatus 10 is used in an optical submarine cable system. An optical submarine cable system according to the present disclosure includes a trunk line that connects terminal stations to each other, and branch lines branching from the trunk line and each being connected to another trunk line or the like. That is, the optical signal monitoring apparatus 10 is used in an optical submarine cable system in which a first branch line T20 is connected to a transmission line T10 being connected to a predetermined terminal station provided in a trunk line, and a second branch line R20 is connected to a reception line R10 connected to the terminal station.

The optical signal monitoring apparatus 10 mainly includes a first extraction unit 11, a first relay line 12, and a first merging unit 13. The optical signal monitoring apparatus 10 is provided on the lines of the first branch line T20 and the second branch line R20.

The first extraction unit 11 selectively extracts first monitoring light included in a transmission signal transmitted from the transmission line T10 to the first branch line T20. As a means for selectively extracting the first monitoring light, the first extraction unit 11 includes, for example, a wavelength selective element.

Further, the first extraction unit 11 transmits return light being transmitted in the direction opposite to the transmission signal in the first branch line T20 to a first relay line 220. In such a case, the return light may be the first monitoring light or other light. The other light is, for example, reflected light generated when the first branch line T20 is broken or the like. More specifically, in a case where the first branch line T20 is broken, the transmission signal causes Fresnel reflection at the broken part, and the reflected light becomes return light.

The first relay line 12 is an optical cable that transmits the extracted first monitoring light to the second branch line R20.

The first merging unit 13 merges the first monitoring light transmitted from the first relay line 12 into the reception signal of the second branch line R20. The signal obtained by merging the reception signal and the first monitoring light is transmitted from the second branch line R20 to the optical signal monitoring apparatus 10, and then is transmitted to the terminal station of the trunk line.

According to the above-described configuration, the optical signal monitoring apparatus 10 may cause the terminal station to recognize the state of the optical cable in the branch line. In particular, the optical signal monitoring apparatus 10 is capable of detecting a broken state of the optical cable on the transmission signal side in the branch line. Therefore, according to the present example embodiment, it is possible to provide an optical signal monitoring apparatus capable of monitoring the quality of a branch line in an optical submarine cable system in which branches are interconnected.

Second Example Embodiment

Figure 2:
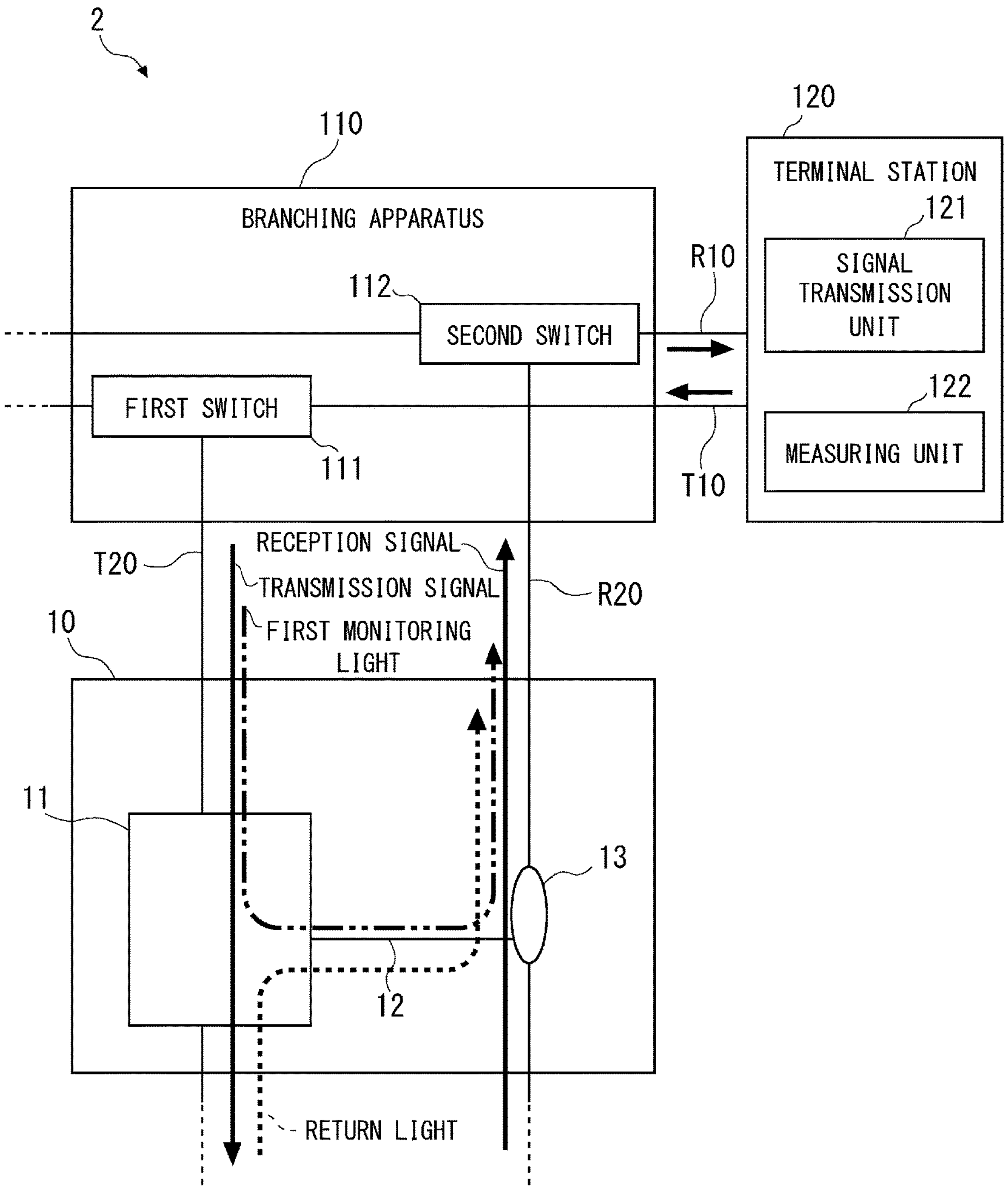
FIG. 2 is a configuration diagram of an optical submarine cable system according to a second example embodiment.

Next, a second example embodiment will be described. FIG. 2 is a configuration diagram of an optical signal monitoring system 2 according to the second example embodiment. An optical signal monitoring system 2 illustrated in FIG. 2 is an excerpt of the optical signal monitoring system 2 in an optical submarine cable system. The optical signal monitoring system 2 mainly includes a first terminal station 120, a branching apparatus 110, and an optical signal monitoring apparatus 10.

The first terminal station 120 is a base station on one end side of a trunk line, and transmits a transmission signal via a transmission line T10 and receives a reception signal via a reception line R10. The first terminal station 120 mainly includes a signal transmission unit 121 and a measurement unit 122.

The signal transmission unit 121 transmits a transmission signal including first monitoring light to the transmission line T10 at the first terminal station 120. More specifically, the signal transmission unit 121 includes, for example, a transponder, a WDM unit, and the like.

The measurement unit 122 measures return light included in the reception line R10 at the first terminal station 120. Further, the measurement unit 122 measures the first monitoring light, based on the state of a first switch and a second switch, and detects whether a first branch line T20 is broken. Note that the first terminal station 120 may use the OTDR method for the above-described functions.

The branching apparatus 110 connects branch lines in the trunk line and switches between the trunk line and the branch line. The branching apparatus 110 mainly includes a first switch 111 and a second switch 112 being optical switches.

The first switch 111 connects the transmission line T10 and the first branch line T20, and is configured to be capable of switching the connection between the transmission line T10 and the first branch line T20. The second switch 112 connects the reception line R10 and a second branch line R20, and is configured to be capable of switching the connection between the reception line R10 and the second branch line R20.

Note that, while FIG. 2 illustrates a configuration in which the branching apparatus 110 and the optical signal monitoring apparatus 10 are separated from each other, the branching apparatus 110 and the optical signal monitoring apparatus 10 may be integrated with each other. That is, the branching apparatus 110 may include the optical signal monitoring apparatus 10, or the optical signal monitoring apparatus 10 may include the branching apparatus 110.

The above-described configuration enables the optical signal monitoring system 2 to transmit the transmission signal transmitted by the signal transmission unit 121 to the first branch line T20. Further, the optical signal monitoring apparatus 10 causes the measurement unit 122 to loop back, via the second branch line R20, the first monitoring light extracted from the transmission signal. Further, the optical signal monitoring apparatus 10 transmits, to a first relay line 12, the return light being transmitted from the direction opposite to the transmission signal of the first branch line T20 in a first extraction unit 11. Accordingly, the measurement unit 122 of the optical signal monitoring system 2 measures the return light. Due to such a configuration, the optical signal monitoring system 2 is able to manage the quality of the optical signal in the branch line and detect the occurrence of breakage or the like in the branch line.

Figure 3:
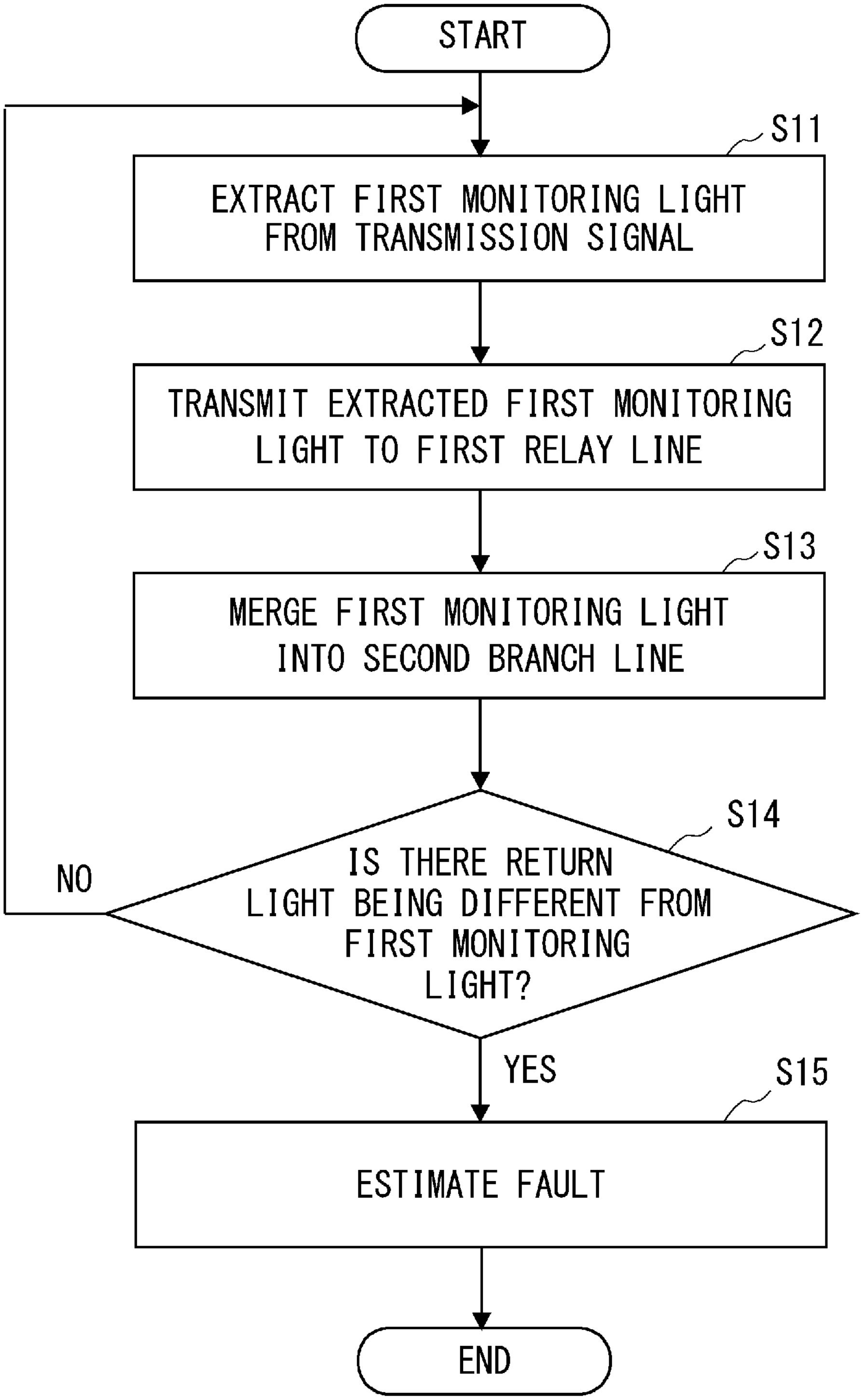
FIG. 3 is a flowchart of an optical signal monitoring method according to the second example embodiment.

Next, processing to be executed by the optical signal monitoring system 2 will be described with reference to FIG. 3. FIG. 3 is a flowchart of an optical signal monitoring method according to the second example embodiment. The method illustrated in FIG. 3 is processing to be executed in a case where a transmission signal is transmitted from the terminal station when the transmission line T10 is connected to the first branch line T20 and the reception line R10 is connected to the second branch line R20. That is, in this case, the transmission signal is being transmitted from the transmission line T10 to the first branch line T20 through the optical switch.

In the flowchart, first, the first extraction unit 11 selectively extracts the first monitoring light included in the transmission signal transmitted from the transmission line T10 to the first branch line T20 (step S11).

Next, the first relay line 12 connecting between the first branch line T20 and the second branch line R20 transmits the extracted first monitoring light to the second branch line R20 (step S12).

Next, a first merging unit 13 merges the first monitoring light transmitted by the first relay line 12 from the first relay line 12 into the reception signal of the second branch line R20 (step S13).

Next, the measurement unit 122 determines whether there is return light being different from the first monitoring light (step S14). When it is not determined that there is the return light (step S14: NO), the optical signal monitoring system 2 returns to step S11. Meanwhile, when it is determined that there is the first monitoring light and the return light (step S14: YES), the optical signal monitoring system 2 proceeds to step S15.

In step S15, the first terminal station 120 of the optical signal monitoring system 2 estimates that there is a fault in the first branch line T20. At this time, the optical signal monitoring system 2 estimates the section of the line in which the fault is occurring and the fault level by using the OTDR method.

The second example embodiment has been described above. The optical signal monitoring system 2 according to the present example embodiment may be provided for each branching apparatus that branches the trunk line and the branch line in the optical submarine cable system. According to the present example embodiment, it is possible to provide an optical signal monitoring apparatus and an optical signal monitoring system capable of monitoring the quality of a branch line in an optical submarine cable system in which branches are interconnected.

Third Example Embodiment

Figure 4:
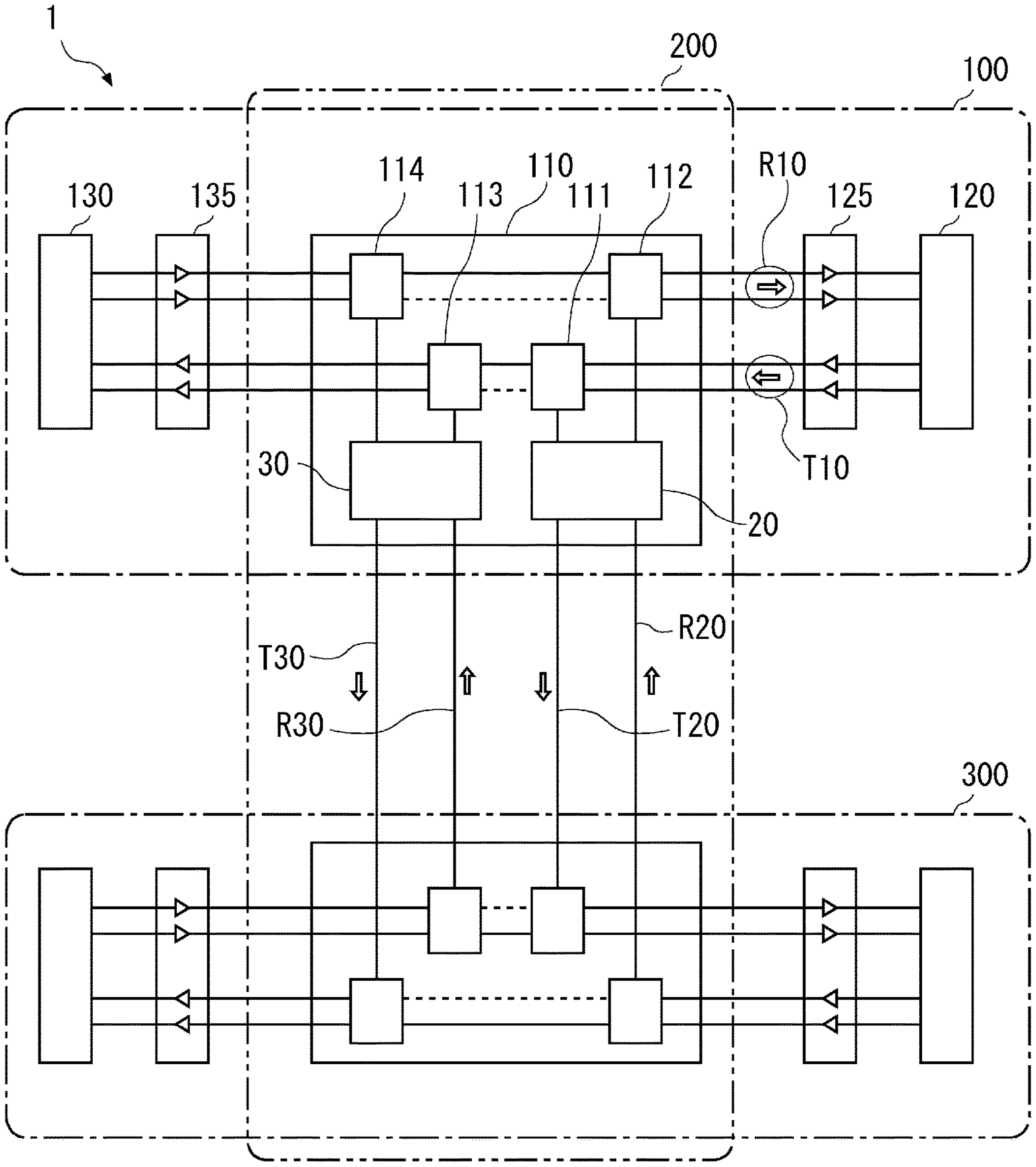
FIG. 4 is a configuration diagram of an optical signal monitoring system according to a third example embodiment.

Next, a third example embodiment will be described. FIG. 4 is a configuration diagram of an optical submarine cable system 1 according to the third example embodiment. The optical submarine cable system 1 includes a first trunk block 100, a branch block 200, and a second trunk block 300.

The first trunk block 100 is a system that connects a first terminal station 120 and a second terminal station 130 to each other by using a plurality of optical cables. The plurality of optical cables are a transmission line T10 and a reception line R10. Note that, the number of the plurality of optical cables in the first trunk block 100 may be three or more. The first trunk block 100 has a first relay apparatus 125 on a side relatively close to the first terminal station 120 and a second relay apparatus 135 on a side relatively close to the second terminal station 130. The first relay apparatus 125 and the second relay apparatus 135 each include a repeater. In the first trunk block 100, a plurality of relay apparatuses as described above are installed per any distance as appropriate.

A branching apparatus 110 is present between the first relay apparatus 125 and the second relay apparatus 135 of the first trunk block 100. The branching apparatus 110 switchably connects the first trunk block 100 and the branch block 200. The branching apparatus 110 mainly includes a first switch 111, a second switch 112, a third switch 113, a fourth switch 114, an optical signal monitoring apparatus 20, and an optical signal monitoring apparatus 30.

The first switch 111 switches between transmitting a transmission signal transmitted from the first terminal station 120 to the second terminal station 130 and transmitting the transmission signal to the second trunk block 300 via a first branch line T20. The second switch 112 switches between transmitting a reception signal transmitted from the second trunk block 300 via a second branch line R20 to the first terminal station 120 and transmitting the reception signal transmitted from the second terminal station 130 to the first terminal station 120. The third switch 113 switches between transmitting the reception signal transmitted from the second trunk block 300 via a fourth branch line R30 to the second terminal station 130 and transmitting the reception signal transmitted from the first terminal station 120 to the second terminal station 130. The fourth switch 114 switches between transmitting the transmission signal transmitted from the second terminal station 130 to the first terminal station 120 and transmitting the transmission signal to the second trunk block 300 via the third branch line T30.

The branching apparatus 110 has the optical signal monitoring apparatus on the lines of the first branch line T20 and the second branch line R20. The branching apparatus 110 has the optical signal monitoring apparatus 30 on the lines of the third branch line T30 and the fourth branch line R30. The optical signal monitoring apparatus 30 has the same configuration as that of the optical signal monitoring apparatus 20. The other end of the branch block 200 is switchably connected to the second trunk block 300 via a branching apparatus provided in the second trunk block 300. The branching apparatus connecting between the branch block 200 and the second trunk block 300 may have a configuration similar to that of the branching apparatus 110. That is, the branching apparatus connecting between the branch block 200 and the second trunk block 300 may have the same configuration as that of the optical signal monitoring apparatus 20.

Figure 5:
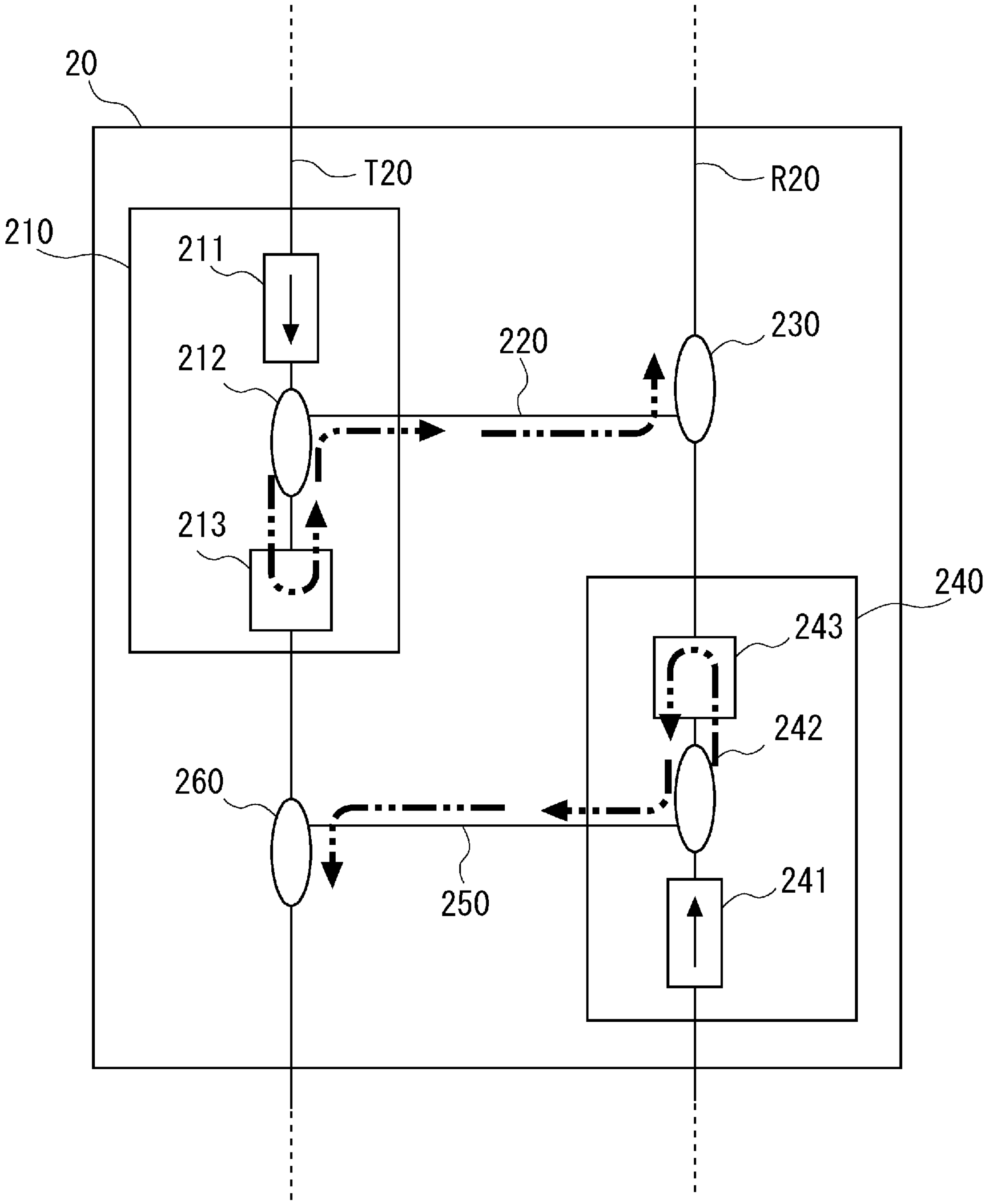
FIG. 5 is a first diagram illustrating a configuration of an optical signal monitoring apparatus and signal flow therein according to the third example embodiment.
Figure 6:
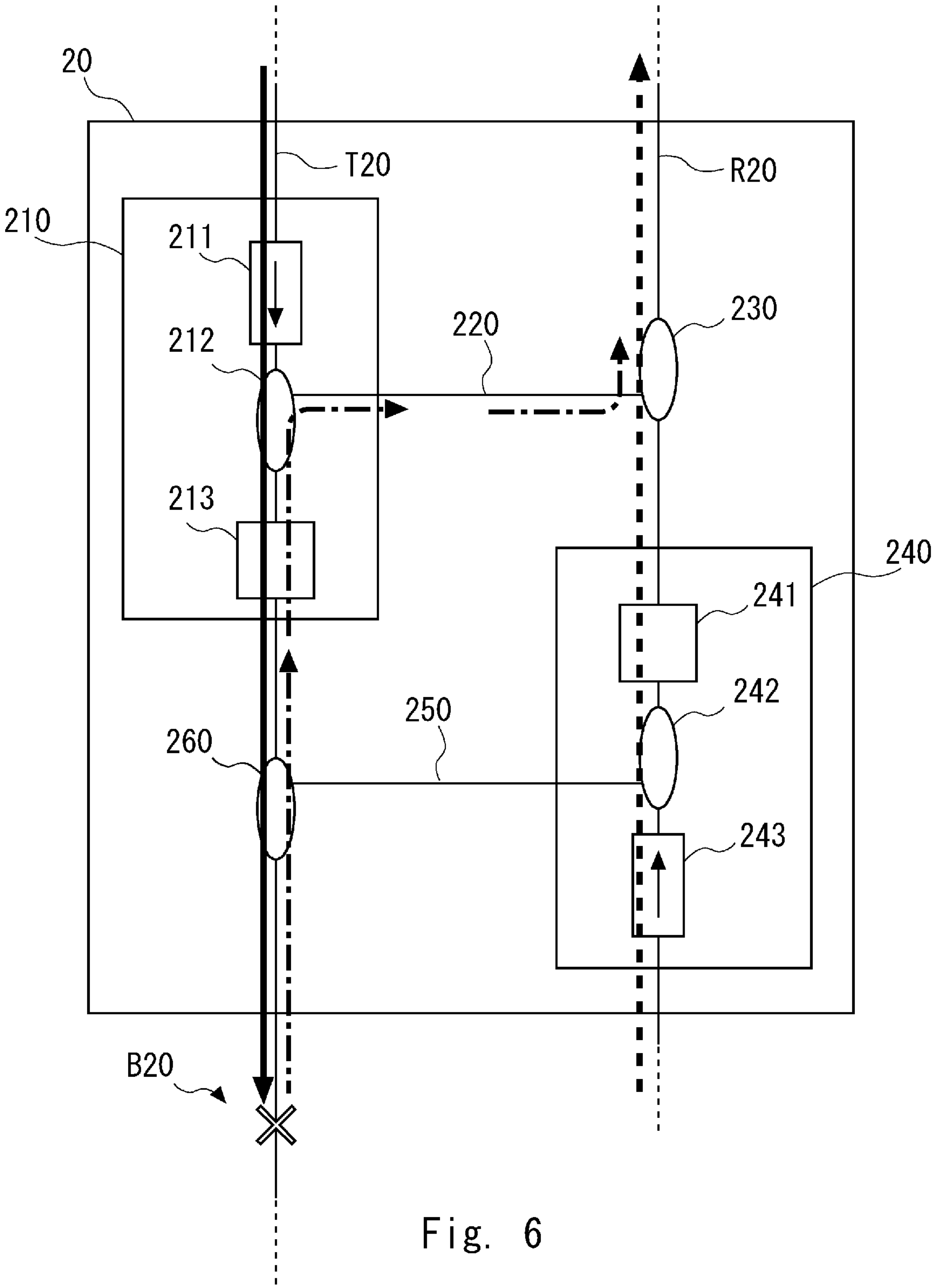
FIG. 6 is a second diagram illustrating a configuration of the optical signal monitoring apparatus and signal flow therein according to the third example embodiment.

Next, the configuration of the optical signal monitoring apparatus 20 will be described with reference to FIG. 5. FIG. 5 is a first diagram illustrating a configuration example of the optical signal monitoring apparatus 20 and a signal flow therein. The optical signal monitoring apparatus 20 mainly includes a first extraction unit 210, a first relay line 220, a first merging unit 230, a second extraction unit 240, a second relay line 250, and a second merging unit 260.

The first extraction unit 210 selectively extracts first monitoring light included in the transmission signal transmitted from the transmission line T10 to the first branch line T20, and transmits the extracted first monitoring light to the first relay line 220. Further, the first extraction unit 210 transmits return light being transmitted to the first branch line T20 to the first relay line 220. The first extraction unit 210 mainly includes an isolator 211, a coupler 212, and a wavelength selective reflector 213.

The isolator 211 is arranged at a position closer to the transmission line T10 than a connection portion with the first relay line 220, and passes light in the same direction as the transmission signal and does not pass light in the direction opposite to the transmission signal. The coupler 212 guides the return light to the first relay line 220 at the connection portion with the first relay line 220. The wavelength selective reflector 213 is configured so as to reflect the first monitoring light included in the transmission signal at a position farther from the transmission line T10 than the connection portion with the first relay line 220, that is, at a position farther from the transmission line T10 than the coupler 212. Thus, the first monitoring light is not transmitted beyond the wavelength selective reflector 213, and is directed to the coupler 212 as return light.

The second extraction unit 240 selectively extracts second monitoring light included in the reception signal at a position farther from the reception line R10 than the merging unit in the second branch line R20. The second extraction unit 240 mainly includes an isolator 241, a coupler 242, and a wavelength selective reflector 243.

The isolator 241 is disposed at a position farther from the reception line R10 than a connection portion between the second branch line R20 and the second relay line 250, and passes the reception signal and does not pass light in a direction opposite to the reception signal. The coupler 242 guides the second monitoring light, which is return light, to the second relay line 250 at the connection portion between the second branch line R20 and the second relay line 250. The wavelength selective reflector 243 is configured to reflect the second monitoring light included in the reception signal at a position closer to the reception line R10 than the connection portion between the second branch line R20 and the second relay line 250.

The second relay line 250 transmits the second monitoring light extracted by the second extraction unit 240 to the first branch line T20. The second merging unit 260 merges the second monitoring light transmitted from the second relay line 250 into the transmission signal of the first branch line T20.

In FIG. 4, the two-dot chain line indicated by a thick line illustrates the first monitoring light and the second monitoring light. As illustrated in FIG. 4, the optical signal monitoring apparatus 20 loops back the first monitoring light included in the transmission signal on the branch line and merges the first monitoring light into the reception signal. Further, the optical signal monitoring apparatus 20 loops back the second monitoring light included in the reception signal on the branch line, and merges the second monitoring light into the transmission signal. According to this configuration, the optical submarine cable system 1 is able to inspect the quality of a signal passing through the branch line.

Referring to FIG. 5, a flow of return light being transmitted to the optical signal monitoring apparatus 20 will be described. FIG. 5 is a second diagram illustrating a configuration example of an optical signal monitoring apparatus and a signal flow therein. FIG. 5 illustrates a signal flow in a case where the first branch line T20 is broken.

In FIG. 5, a solid arrow indicated by a thick line illustrates a transmission signal. The first branch line T20 illustrated in FIG. 5 is broken at a breakage portion B20. A dashed-dotted line arrow indicated by a thick line and extending from the breakage portion B20 toward the first extracting portion 210 illustrates return light caused by Fresnel reflection generated in the breakage portion B20. The return light passes through the second merging unit 260 and the wavelength selective reflector 213, and is transmitted to the first relay line 220 in the coupler 212 from the breakage portion B20. Further, the return light merges, from the first relay line 220, into the reception signal of the second branch line R20 via the first merging unit 230. Note that the reception signal is illustrated with a dotted line arrow indicated by a thick line.

The third example embodiment has been described above. As described above, the optical signal monitoring apparatus 20 merges, into the reception signal via the first relay line 220, the return light being generated when the first branch line T20 that transmits the transmission signal of the branch line is broken. Therefore, according to the present example embodiment, it is possible to provide a monitoring apparatus or the like capable of monitoring the quality of a system in a system in which branches are interconnected.

Fourth Example Embodiment

Figure 7:
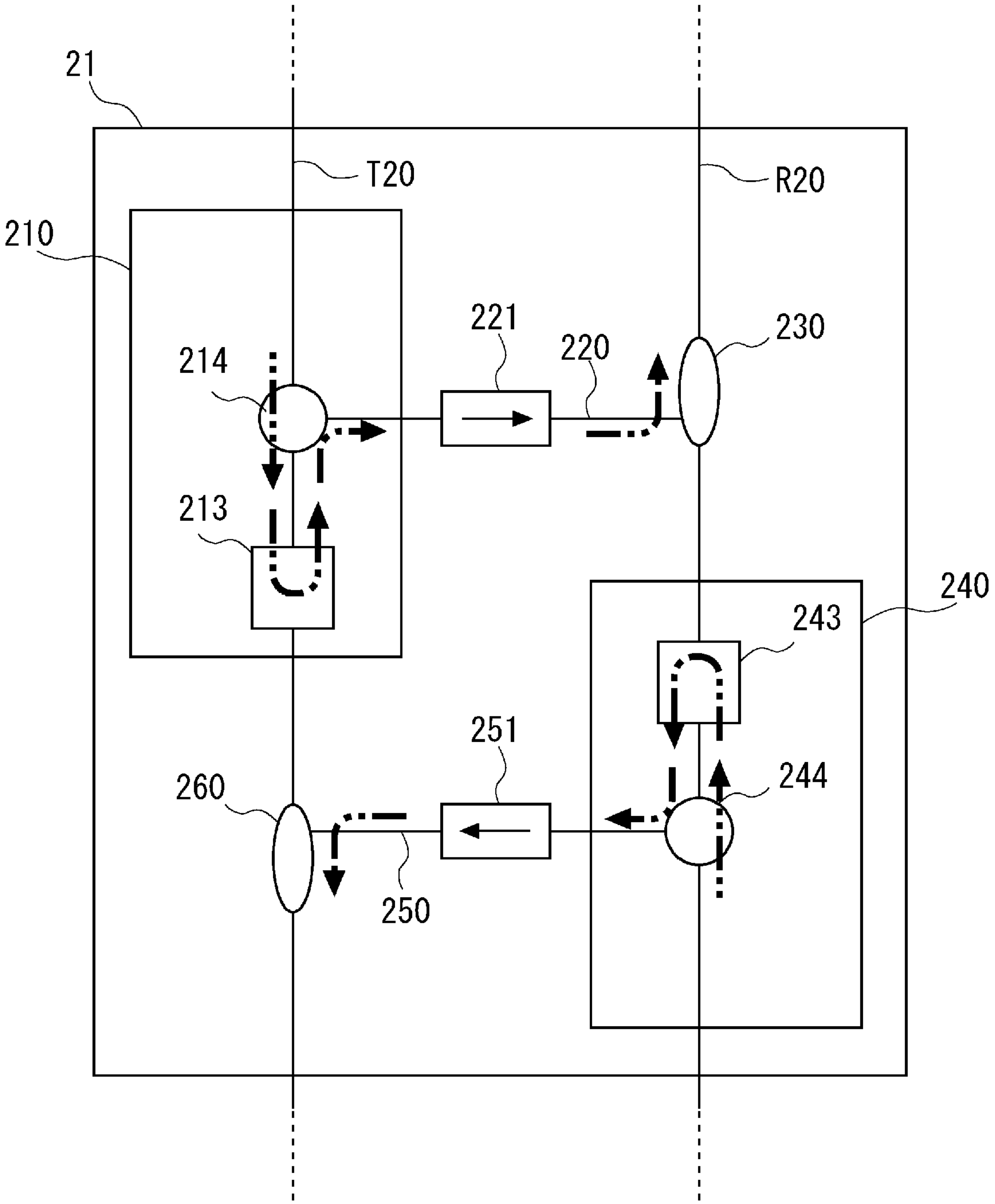
FIG. 7 is a configuration diagram of an optical signal monitoring apparatus according to a fourth example embodiment.

Next, a fourth example embodiment will be described. The fourth example embodiment differs from the optical signal monitoring apparatus 20 according to the third example embodiment in the specific configuration of the optical signal monitoring apparatus. FIG. 7 is a configuration diagram of an optical signal monitoring apparatus 21 according to the fourth example embodiment.

A first extraction unit 210 according to the present example embodiment mainly includes a wavelength selective reflector 213 and a circulator 214. The circulator 214 transmits, to a first relay line 220, return light transmitted to a connection portion with the first relay line 220.

A second extraction unit 240 according to the present example embodiment mainly includes a wavelength selective reflector 243 and a circulator 244. The circulator 244 transmits, to a second relay line 250, return light transmitted to a connection portion with the second relay line 250.

As illustrated in FIG. 7, the first relay line 220 may include an isolator 221 that allows only light from a first branch line T20 toward a second branch line R20 to pass therethrough. Similarly, the second relay line 250 may include an isolator 251 that allows only light from the second branch line R20 toward the first branch line T20 to pass therethrough.

As described above, according to the present example embodiment, it is possible to provide a monitoring apparatus or the like capable of monitoring the quality of a system in a system in which branches are interconnected.

Note that, the present disclosure is not limited to the above-described example embodiments, and can be appropriately modified without departing from the scope. For example, some or all of the configurations described in each of the example embodiments may be included in other example embodiments.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

An example advantage according to the present disclosure is to provide an optical signal monitoring apparatus capable of monitoring the quality of a branch line in an optical submarine cable system in which branches are interconnected.

What is claimed is:

1. An optical signal monitoring apparatus configured to be used in an optical submarine cable system configured to connect a first branch line to a transmission line being connected to a predetermined terminal station provided in a trunk line and connect a second branch line to a reception line being connected to the terminal station, the optical signal monitoring apparatus comprising:

a first extraction unit configured to selectively extract first monitoring light included in a transmission signal transmitted from the transmission line to the first branch line;

a first relay line configured to transmit the extracted first monitoring light to the second branch line; and a first merging unit configured to merge the first monitoring light from the first relay line into a reception signal of the second branch line, wherein the first extraction unit transmits, to the first relay line, return light being transmitted in a direction opposite to the transmission signal in the first branch line, wherein the first extraction unit includes a circulator configured to transmit return light of the first branch line being transmitted to a connection portion with the first relay line, to the first relay line, and a wavelength selective reflector configured to reflect the first monitoring light included in the transmission signal at a position farther from the transmission line than the connection portion with the first relay line.

2. The optical signal monitoring apparatus according to claim 1, wherein the first extraction unit transmits, to the first relay line, return light caused by Fresnel reflection occurring when the first branch line is broken.

3. The optical signal monitoring apparatus according to claim 1, wherein the first extraction unit includes an isolator being disposed at a position closer to the transmission line than a connection portion with the first relay line, a coupler configured to guide return light of the first branch line to the first relay line, and a wavelength selective reflector configured to reflect the first monitoring light at a position farther from the transmission line than the connection portion with the first relay line.

4. The optical signal monitoring apparatus according to claim 1, further comprising:

a second extraction unit configured to selectively extract second monitoring light included in the reception signal, at a position farther from the reception line than the first merging unit in the second branch line;

a second relay line configured to transmit the extracted second monitoring light to the first branch line; and a second merging unit configured to merge the second monitoring light transmitted from the second relay line into the transmission signal of the first branch line.

5. The optical signal monitoring apparatus according to claim 4, wherein the second extraction unit includes a wavelength selective reflector configured to reflect the second monitoring light included in the reception signal at a position closer to the reception line than a connection portion with the second relay line, a coupler configured to guide the second monitoring light being return light being transmitted in a direction opposite to the reception signal, to the second relay line, and an isolator disposed at a position farther from the reception line than the connection portion with the second relay line.

6. The optical signal monitoring apparatus according to claim 4, wherein the second extraction unit includes a circulator configured to transmit return light being transmitted to a connection portion with the second relay line, to the second relay line, and a wavelength selective reflector configured to reflect the second monitoring light included in the reception signal at a position closer to the reception line than the connection portion with the second relay line.

7. An optical signal monitoring system comprising a branching apparatus including a first switch configured to be able to switch connection between the transmission line and the first branch line, and a second switch configured to be able to switch connection between the reception line and the second branch line, wherein the branching apparatus further includes the optical signal monitoring apparatus according to claim 1.

8. The optical signal monitoring system according to claim 7, further comprising:

the branching apparatus;

a signal transmission unit configured to transmit the transmission signal including the first monitoring light to the transmission line at the terminal station; and a measurement unit configured to measure return light included in the reception line at the terminal station, measure the first monitoring light, based on states of the first switch and the second switch, and detect whether the first branch line is broken.

9. The optical signal monitoring system according to claim 8, wherein in the optical signal monitoring apparatus, the first extraction unit transmits, to the first relay line, return light caused by Fresnel reflection occurring when the first branch line is broken.

10. The optical signal monitoring system according to claim 8, wherein in the optical signal monitoring apparatus, the first extraction unit includes an isolator being disposed at a position closer to the transmission line than a connection portion with the first relay line, a coupler configured to guide return light of the first branch line to the first relay line, and a wavelength selective reflector configured to reflect the first monitoring light at a position farther from the transmission line than the connection portion with the first relay line.

11. The optical signal monitoring system according to claim 8, wherein in the optical signal monitoring apparatus, the first extraction unit includes a circulator configured to transmit return light of the first branch line being transmitted to a connection portion with the first relay line, to the first relay line, and a wavelength selective reflector configured to reflect the first monitoring light included in the transmission signal at a position farther from the transmission line than the connection portion with the first relay line.

12. The optical signal monitoring system according to claim 8, wherein the optical signal monitoring apparatus further comprising:

a second extraction unit configured to selectively extract second monitoring light included in the reception signal, at a position farther from the reception line than the first merging unit in the second branch line;

a second relay line configured to transmit the extracted second monitoring light to the first branch line; and a second merging unit configured to merge the second monitoring light transmitted from the second relay line into the transmission signal of the first branch line.

13. The optical signal monitoring system according to claim 12, wherein in the optical signal monitoring apparatus, the second extraction unit includes a wavelength selective reflector configured to reflect the second monitoring light included in the reception signal at a position closer to the reception line than a connection portion with the second relay line, a coupler configured to guide the second monitoring light being return light being transmitted in a direction opposite to the reception signal, to the second relay line, and an isolator disposed at a position farther from the reception line than the connection portion with the second relay line.

14. The optical signal monitoring system according to claim 12, wherein in the optical signal monitoring apparatus, the second extraction unit includes a circulator configured to transmit return light being transmitted to a connection portion with the second relay line, to the second relay line, and a wavelength selective reflector configured to reflect the second monitoring light included in the reception signal at a position closer to the reception line than the connection portion with the second relay line.

15. An optical signal monitoring method to be used in an optical submarine cable system configured to connect a first branch line to a transmission line being connected to a predetermined terminal station provided in a trunk line, and connect a second branch line to a reception line being connected to the terminal line, the method comprising, by an optical signal monitoring apparatus:

selectively extracting first monitoring light included in a transmission signal transmitted from the transmission line to the first branch line;

transmitting the extracted first monitoring light to the second branch line via a first relay line connecting between the first branch line and the second branch line;

merging the first monitoring light from the first relay line into a reception signal of the second branch line; and in a case where the first branch line is broken, transmitting return light being generated from the broken part and transmitted in a direction opposite to the transmission signal, from the first branch line to the first relay line, wherein the method includes:

transmitting return light of the first branch line being transmitted to a connection portion with the first relay line, to the first relay line by a circulator; and reflecting the first monitoring light included in the transmission signal at a position farther from the transmission line than the connection portion with the first relay line by a wavelength selective reflector.

16. The optical signal monitoring method according to claim 15, wherein the method further includes;

transmitting, to the first relay line, return light caused by Fresnel reflection occurring when the first branch line is broken.

17. The optical signal monitoring method according to claim 15, wherein the method includes;

selectively extracting first monitoring light by an isolator, disposed at a position closer to the transmission line than a connection portion with the first relay line, guiding return light of the first branch line to the first relay line by a coupler, and reflecting the first monitoring light at a position farther from the transmission line than the connection portion with the first relay line by a wavelength selective reflector.

18. The optical signal monitoring method according to claim 15, wherein the method includes;

selectively extracting second monitoring light included in the reception signal, at a position farther from the reception line than the first merging unit in the second branch line;

transmitting the extracted second monitoring light to the first branch line; and merging the second monitoring light transmitted from the second relay line into the transmission signal of the first branch line.

19. The optical signal monitoring method according to claim 18, wherein the method includes;

reflecting the second monitoring light included in the reception signal at a position closer to the reception line than a connection portion with the second relay line by a wavelength selective reflector, guiding the second monitoring light, being return light being transmitted in a direction opposite to the reception signal, to the second relay line by a coupler.

20. The optical signal monitoring method according to claim 18, wherein the method includes;

transmitting return light being transmitted to a connection portion with the second relay line, to the second relay line by a circulator, and reflecting the second monitoring light included in the reception signal at a position closer to the reception line than the connection portion with the second relay line by a wavelength selective reflector.

* * * * *